(12) United States Patent
Sakamoto et al.

(10) Patent No.: US 8,856,159 B2
(45) Date of Patent: Oct. 7, 2014

(54) CONTENT RECOMMENDATION SYSTEM, CONTENT RECOMMENDATION METHOD, CONTENT RECOMMENDATION APPARATUS, PROGRAM, AND INFORMATION STORAGE MEDIUM

(75) Inventors: Takayuki Sakamoto, Kanagawa (JP); Hiroki Kato, Kanagawa (JP); Tsuyoshi Takagi, Saitama (JP)

(73) Assignee: Sony Corporation, Tokyo (JP)

( * ) Notice: Subject to any disclaimer, the term of this patent is extended or adjusted under 35 U.S.C. 154(b) by 423 days.

(21) Appl. No.: 13/059,644

(22) PCT Filed: Sep. 3, 2009

(86) PCT No.: PCT/JP2009/065445
§ 371 (c)(1),
(2), (4) Date: Feb. 18, 2011

(87) PCT Pub. No.: WO2010/027033
PCT Pub. Date: Mar. 11, 2010

(65) Prior Publication Data
US 2011/0145263 A1      Jun. 16, 2011

(30) Foreign Application Priority Data
Sep. 5, 2008   (JP) ................... 2008-229112

(51) Int. Cl.
*G06F 17/30*      (2006.01)
*G06Q 30/02*      (2012.01)

(52) U.S. Cl.
CPC .......... *G06F 17/30997* (2013.01); *G06Q 30/02* (2013.01); *G06F 17/30766* (2013.01); *G06F 17/30743* (2013.01); *G06F 17/30749* (2013.01)
USPC ...................................... 707/758

(58) Field of Classification Search
USPC .......................... 707/953, 962, 758
See application file for complete search history.

(56) References Cited

U.S. PATENT DOCUMENTS 8,175,989 B1 *   5/2012   Gopinath et al. ............... 706/45
2008/0147215 A1 *   6/2008   Kim et al. ...................... 700/94
2008/0250328 A1 *  10/2008   Konttinen ..................... 715/747

FOREIGN PATENT DOCUMENTS

JP   2003-167585   6/2003
JP   2006-058747   3/2006

OTHER PUBLICATIONS

Lehtiniemi, Arto. "Evaluating SuperMusic: streaming context-aware mobile music service." Proceedings of the 2008 International Conference on Advances in Computer Entertainment Technology. ACM, 2008.*

(Continued)

*Primary Examiner* — Usmaan Saeed
*Assistant Examiner* — Nan Hutton
(74) *Attorney, Agent, or Firm* — Finnegan, Henderson, Farabow, Garrett & Dunner, L.L.P.

(57) ABSTRACT

A content recommendation system includes: an attribute value storage means which stores one or more attribute values of attributes for each content; a preference distribution storage means which stores a user preference degree for each attribute value; an attribute value acquisition means which acquires an attribute value of at least one attribute for each content; a preference distribution update means which updates the storage contents in the preference distribution storage means in accordance with the acquired attribute value; a condition determination means which selects an attribute value of one or more attributes in accordance with probability based on the user preference degree stored in the preference distribution storage means and determines the condition of the attribute value of the one or more attributes in accordance with the selected attribute value; and a content selection means which selects some or all of the contents in accordance with the determined condition.

20 Claims, 18 Drawing Sheets

(56) References Cited

OTHER PUBLICATIONS

Koren, Yehuda, Robert Bell, and Chris Volinsky. "Matrix factorization techniques for recommender systems." Computer 42.8 (2009): 30-37.*

Kim, Jong-Hun, Kyung-Yong Jung, and Jung-Hyun Lee. "Hybrid music filtering for recommendation based ubiquitous computing environment." Rough Sets and Current Trends in Computing. Springer Berlin Heidelberg, 2006.*

* cited by examiner

FIG.5

| MUSIC ID | STYLE | YEAR WHEN ARTIST WAS BORN | YEAR WHEN ARTIST MADE DEBUT | YEAR WHEN ARTIST WAS RATED IN HIT CHART | ... |
|---|---|---|---|---|---|
| 001 | ROCK MUSIC | 1980 | 2003 | 2007 | ... |
| 002 | POP MUSIC | 1960 | 1980 | 1993 | ... |

FIG.6

| MUSIC ID | FEATURE 1 | FEATURE 2 | FEATURE 3 | FEATURE 4 | ... | FEATURE M |
|---|---|---|---|---|---|---|
| 001 | 0.1 | 0.2 | 0.3 | 0.0 | | 0.1 |
| 002 | 0.8 | 0.0 | 0.0 | 0.1 | | 0.0 |

FIG.8

```
THEME #2     "Y WHO MADE HIT IN X"

THEME #1     "ARTIST Y BORN IN X"

FILTER A:  YEAR WHEN ARTIST WAS BORN = X
    FILTER B:  STYLE = Y
```

FIG.11

| GROUP ID | THEME |
|---|---|
| 001 | THEME #1, THEME #3, THEME #5 · · · |
| 002 | THEME #2, THEME #6, THEME #7 · · · |

FIG.12

| BEFORE CONVERSION | AFTER CONVERSION |
|---|---|
| YEAR WHEN ARTIST WAS BORN=1980 | YEAR WHEN ARTIST WAS RATED IN HIT CHART=2000, YEAR WHEN ARTIST WAS RATED IN HIT CHART=2001, ... |
| YEAR WHEN ARTIST MADE DEBUT=2003 | YEAR WHEN ARTIST WAS RATED IN HIT CHART=2003, YEAR WHEN ARTIST WAS RATED IN HIT CHART=2004, ... |
| STYLE=POP MUSIC | YEAR WHEN ARTIST MADE DEBUT=1980, YEAR WHEN ARTIST MADE DEBUT=1990 |

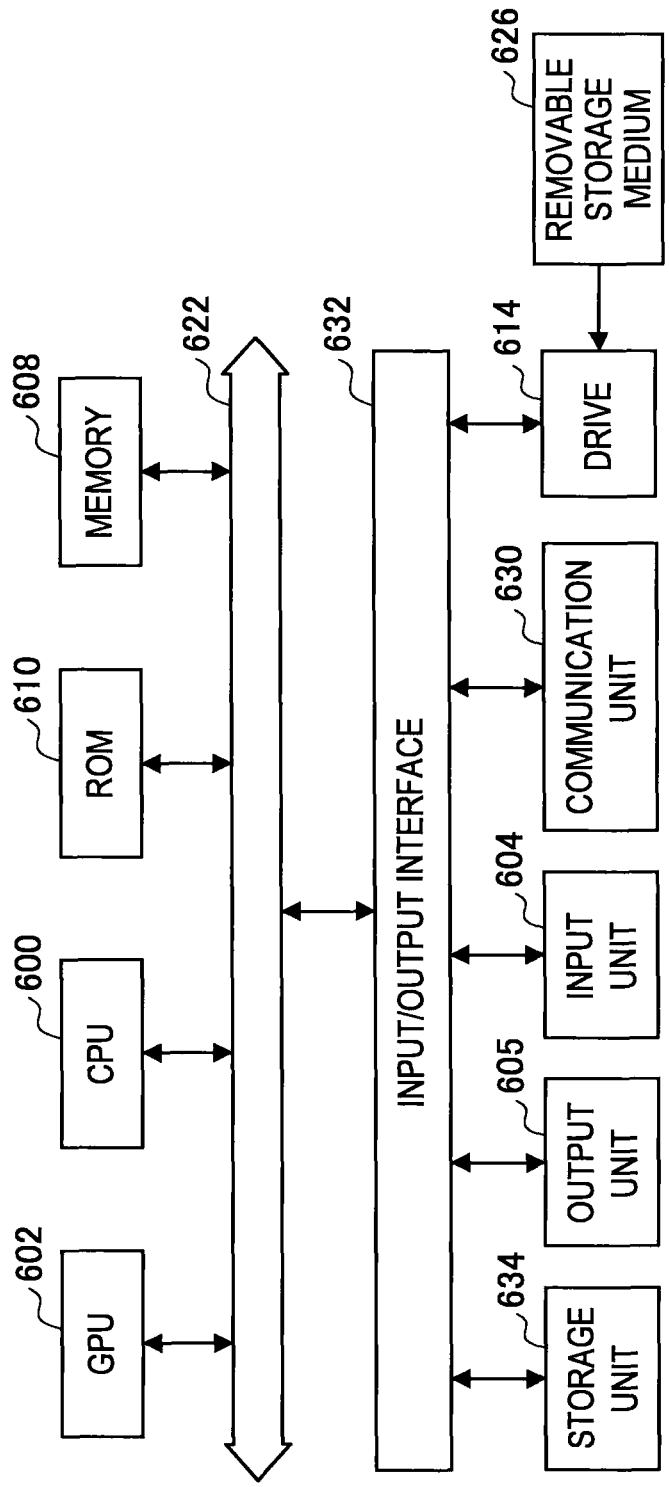

CONTENT RECOMMENDATION SYSTEM, CONTENT RECOMMENDATION METHOD, CONTENT RECOMMENDATION APPARATUS, PROGRAM, AND INFORMATION STORAGE MEDIUM

TECHNICAL FIELD

The present invention relates to a content recommendation system, a content recommendation method, a content recommendation apparatus, a program, and an information storage medium, and more particularly to a content recommendation technique.

BACKGROUND ART

In recent years, a user can enjoy a desired content chosen from among an enormous number of contents using a communication network such as the Internet. Since there are an enormous number of available contents, various kinds of recommendation techniques have been suggested. For example, a technique for searching a type of a content preferred by a user and presenting the found content to the user is known (see Japanese Patent Application Laid-Open No. 2006-58947).

SUMMARY OF INVENTION

Technical Problem

However, a user does not necessarily prefer only one type of content, and may enjoy multiple types of contents with a certain ratio. For example, a user who usually enjoys rock music may sometimes enjoy classical music.

The present invention is made in view of the above issues, and it is an object of the present invention to provide a content recommendation system, a content recommendation method, a program, and an information storage medium capable of recommendation various types of contents so as to satisfy a variety of preferences of a user.

Solution to Problem

In order to solve the above issues, a content recommendation system according to the present invention includes an attribute value storage means for storing an attribute value of each of one or a plurality of attributes for each of a plurality of contents, a preference distribution storage means for storing a degree of user's preference with respect to each attribute value for each of the attributes, an attribute value acquisition means for obtaining an attribute value of at least one attribute for each of one or more contents owned by a user, a preference distribution update means for updating a content stored in the preference distribution storage means, based on the attribute value obtained by the attribute value acquisition means, a condition determining means for selecting attribute values of one or more attributes according to a probability based on the degree of user's preference stored in the preference distribution storage means, and determining a condition for the attribute values of one or more attributes according to the selected attribute value, a content selection means for selecting some or all of the plurality of contents according to the condition determined by the condition determining means, and a content presenting means for presenting the contents selected by the content selection means to the user.

Further, a content recommendation method according to the present invention includes an attribute value obtaining step for obtaining an attribute value of at least one attribute for each of one or more contents owned by a user, a preference distribution update step for updating a content stored in a preference distribution storage means storing a degree of user's preference with respect to each attribute value for each of one or more attributes of a content, based on the attribute value obtained in the attribute value acquisition step, a condition determining step for selecting attribute values of one or more attributes according to a probability based on the degree of user's preference stored in the preference distribution storage means, and determining a condition for the attribute values of one or more attributes according to the selected attribute value, a content selection step for selecting some or all of the plurality of contents according to the condition determined in the condition determining step, and a content presenting step for presenting the contents selected in the content selection step to the user.

According to one aspect of the present invention, the attribute value acquisition means obtains at least one attribute value of the attribute for each content stored in association with the user in the predetermined computer.

Further, a content recommendation apparatus according to the present invention includes a preference distribution storage means for storing a degree of user's preference with respect to each attribute value of an attribute of a content, an attribute value acquisition means for obtaining attribute values of attributes for each of one or more contents owned by a user, a preference distribution update means for updating a content stored in the preference distribution storage means, based on the attribute value obtained by the attribute value acquisition means, an attribute value selection means for selecting attribute values of attributes according to a probability based on the degree of user's preference stored in the preference distribution storage means, and a list acquisition means for obtaining a list of contents selected from among a plurality of contents according to a condition based on the attribute values of the attributes selected by the attribute value selection means.

Further, a content recommendation method according to the present invention includes an attribute value obtaining step for obtaining an attribute value of a predetermined attribute for each of one or more contents owned by a user, a preference distribution update step for updating a content stored in a preference distribution storage means storing a degree of user's preference with respect to each attribute value of the attribute, based on the attribute value obtained by an attribute value acquisition means, an attribute value selection step for selecting the attribute values of the attributes according to a probability based on the degree of user's preference stored in the preference distribution storage means, and a list acquisition step for obtaining a list of contents selected from among a plurality of contents according to a condition based on the attribute values of the attributes selected in the attribute value selection step.

Further, a program according to the present invention causes a computer to function as: a preference distribution storage means for storing a degree of user's preference with respect to each attribute value of an attribute of a content; an attribute value acquisition means for obtaining attribute values of attributes for each of one or more contents owned by a user; a preference distribution update means for updating a content stored in the preference distribution storage means, based on the attribute value obtained by the attribute value acquisition means; an attribute value selection means for selecting attribute values of attributes according to a probability based on the degree of user's preference stored in the preference distribution storage means; and a list acquisition means for obtaining a list of contents selected from among a plurality of contents according to a condition based on the attribute values of the attributes selected by the attribute value selection means.

Further, an information storage medium according to the present invention, stores a program for causing a computer to function as: a preference distribution storage means for storing a degree of user's preference with respect to each attribute value of an attribute of a content; an attribute value acquisition means for obtaining attribute values of attributes for each of one or more contents owned by a user; a preference distribution update means for updating a content stored in the preference distribution storage means, based on the attribute value obtained by the attribute value acquisition means; an attribute value selection means for selecting attribute values of attributes according to a probability based on the degree of user's preference stored in the preference distribution storage means; and a list acquisition means for obtaining a list of contents selected from among a plurality of contents according to a condition based on the attribute values of the attributes selected by the attribute value selection means.

BRIEF DESCRIPTION OF DRAWINGS

FIG. 5 is a configuration diagram illustrating first metadata.

FIG. 6 is a configuration diagram illustrating second metadata.

FIG. 8 is a diagram schematically illustrating theme template data.

FIG. 11 is a configuration diagram illustrating theme group data.

FIG. 12 is a diagram schematically illustrating an attribute value conversion dictionary.

FIG. 18 is a hardware configuration diagram illustrating a general-purpose personal computer.

DESCRIPTION OF EMBODIMENTS

An embodiment of the present invention will be hereinafter explained in detail with reference to drawings.

Figure 1:
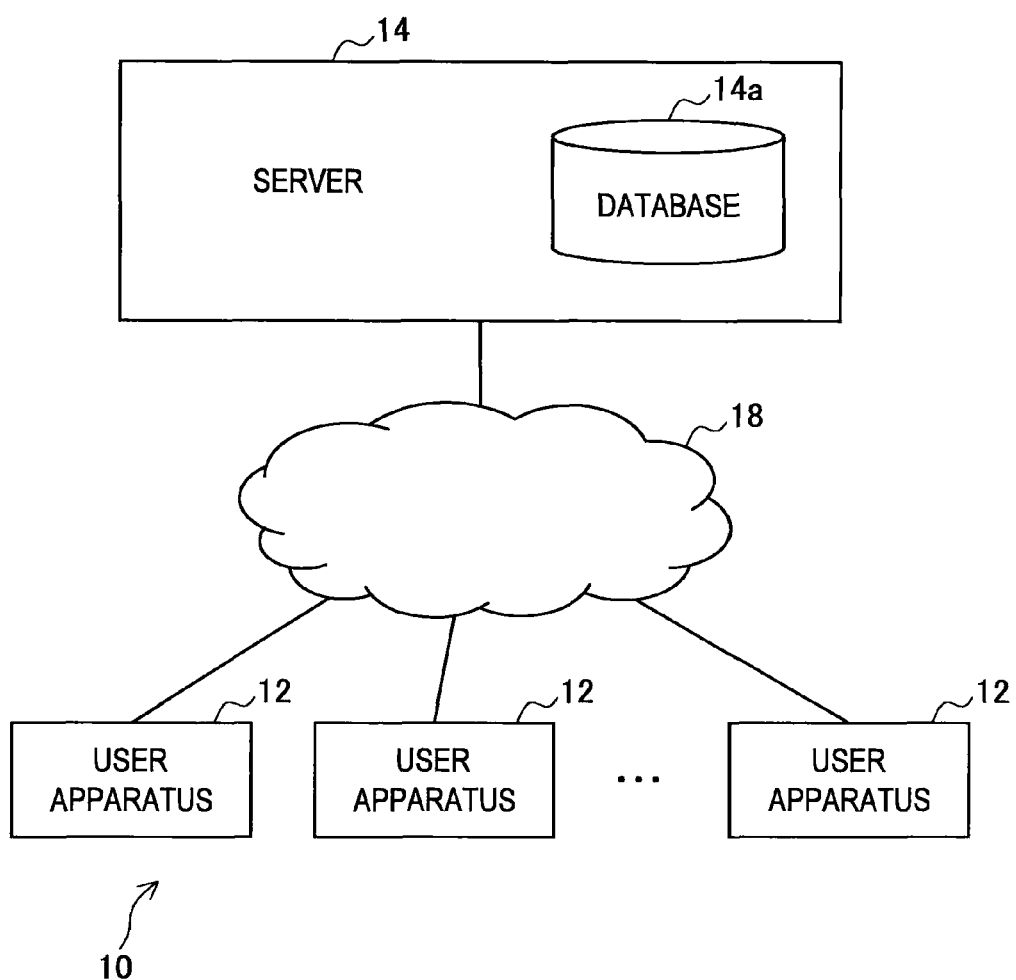
FIG. 1 is an overall configuration diagram illustrating a content recommendation system according to an embodiment of the present invention.

FIG. 1 is an overall configuration diagram illustrating a content recommendation system according to an embodiment of the present invention. As shown in this figure, this content recommendation system 10 is connected to a data communication network 18 such as the Internet, and includes a server 14 (first content recommendation apparatus) capable of mutual data communication and a plurality of user apparatuses 12 (second content recommendation apparatus). The server 14 includes a database 14a. For example, the user apparatus 12 may be a computer system installed in each home such as a personal computer, a computer game system, and a home server, and a portable machine such as a portable game machine. The user apparatus 12 accesses the server 14, and receives a list of songs recommended to a user of the user apparatus 12. The user apparatus 12 requests the server 14 to provide song data included in the list, receives the song data, and play the songs. On the other hand, for example, the server 14 is constituted by a computer system such as a known server computer, and transmits, to each user apparatus 12, a list of songs recommended to the user of the user apparatus 12. In addition, the server 14 transmits individual song data in response to a request of each user apparatus 12. In this example, the present invention is applied to recommendation of songs. However, the present invention is not limited thereto. It is to be understood that the present invention may be applied to recommendation of various kinds of contents, e.g., a motion image such as a movie, a still image such as a picture, and a document such as a novel.

Figure 2:
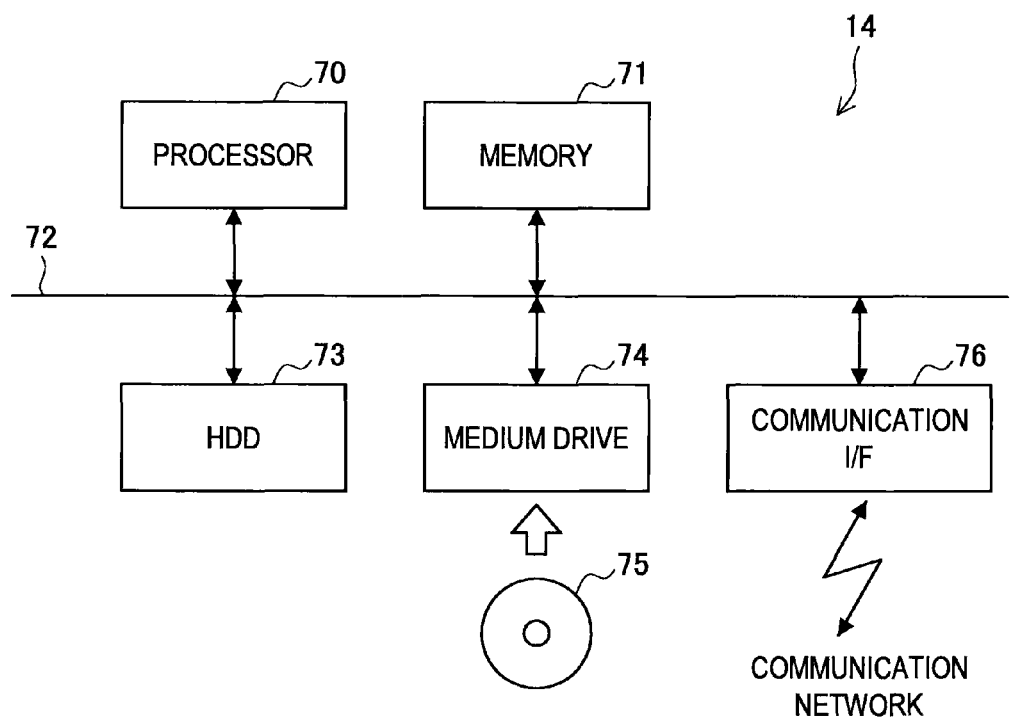
FIG. 2 is a hardware configuration diagram illustrating a server.

FIG. 2 is a figure illustrating an example of hardware configuration of the server 14. As shown in this figure, the server 14 includes a processor 70, a memory 71, a hard disk drive 73, a medium drive 74, and a communication interface 76, which are connected to a bus 72 so as to mutually exchange data. The memory 71 includes a ROM and a RAM. The ROM stores various kinds of system programs. The RAM is mainly used for a work area of the processor 70. The hard disk drive 73 stores a program for distributing songs and distributing a list of recommended songs, and the database 14a is structured for distributing songs and distributing a list of recommended songs. The medium drive 74 is a device for reading data stored in a computer-readable medium 75 such as a CD-ROM and a DVD-RAM, or writing data to the computer-readable medium 75. The communication interface 76 controls data communication via the communication network 18 with the user apparatus 12. The processor 70 controls each unit of the server 14 according to a program stored in the memory 71, the hard disk drive 73, or the medium 75.

Figure 3:
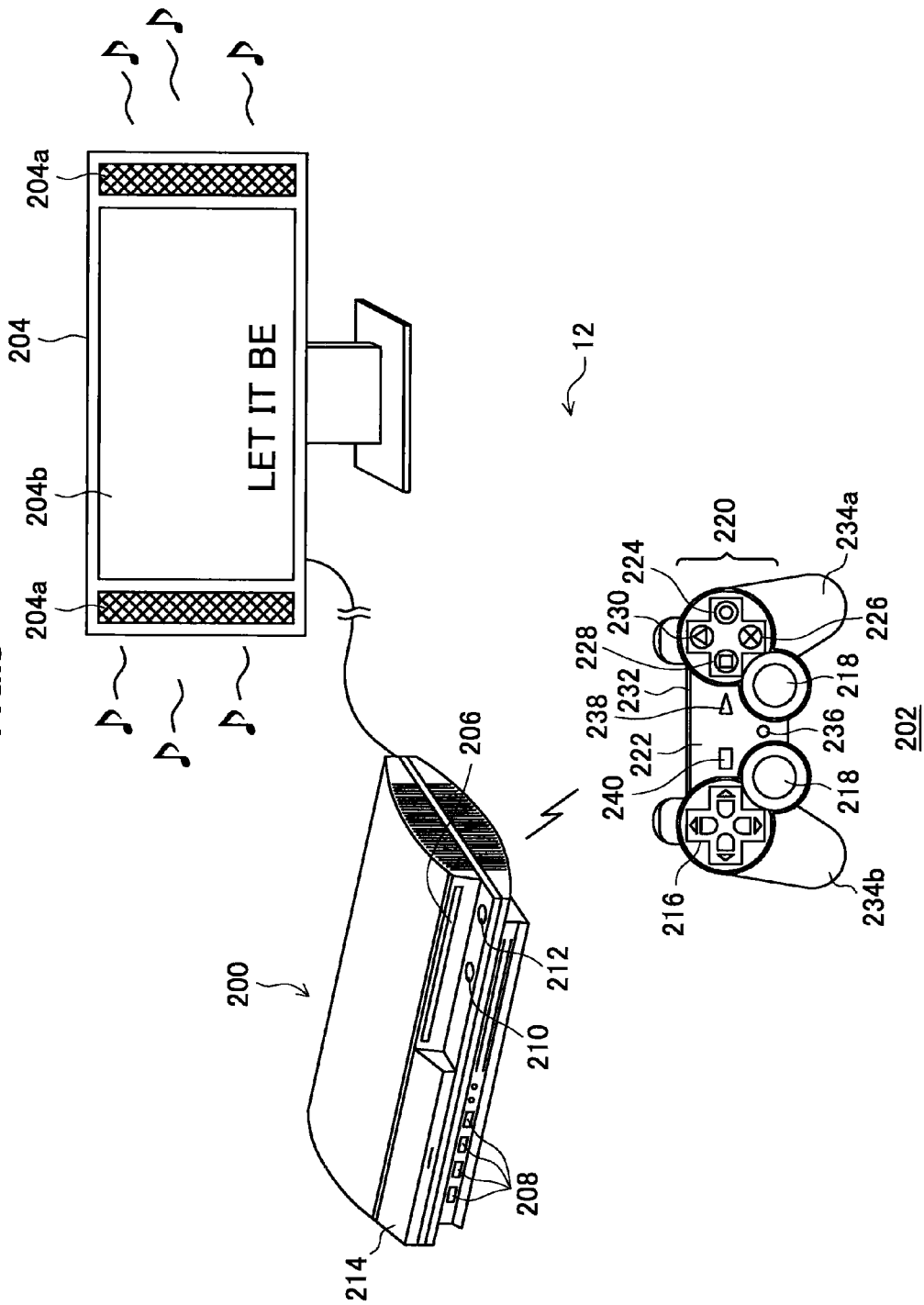
FIG. 3 is a perspective view illustrating an external appearance of a game system used as a user apparatus.

Subsequently, the user apparatus 12 will be explained in detail. FIG. 3 is an external view illustrating a computer game system used as the user apparatus 12. This computer game system includes a game machine 200, an operation device 202, and a television monitor 204. The game machine 200 is a computer game system, which executes not only game programs but also various kinds of programs such as a Web browser and movie/music player programs. The program may be read from various kinds of computer-readable media such as various kinds of optical disks, internal or external hard disk drives, and semiconductor memories, or may be downloaded via a computer network such as the Internet. The operation device 202 is wirelessly communicatively connected to the game machine 200 or communicatively connected thereto via a wire.

The game machine 200 includes a disk insertion slot 206 compatible with optical disks, a USB connection terminal 208, and the like. The disk insertion slot 206 is configured such that optical disks such as a BD (Blu-ray disk, trademark), a DVD-ROM, and a CD-ROM can be loaded in the slot. A touch sensor 210 is used to instruct the game machine 200 to unload a disk. A touch sensor 212 is used to instruct the game machine 200 to turn the power on or off. A power switch, an audio and video output terminal, an optical digital output terminal, an AC power input terminal, a LAN connector, an HDMI terminal, and the like (not shown) are provided at the rear side of the game machine 200.

The game machine 200 is also provided with a multimedia slot for receiving multiple types of detachable semiconductor memories. Multiple slots, not shown, are exposed to receive respectively different types of semiconductor memories, when a lid 214 arranged on the front surface of the game machine 200 is opened.

The operation device 202 is driven by a not-shown battery, and includes a plurality of buttons and keys with which a user makes operation inputs. When the user operates the buttons and keys on the operation device 202, the operation contents are transmitted to the game machine 200 wirelessly or by a wire.

The operation device 202 has an arrow key 216, joy sticks 218, and a group of operation buttons 220. The arrow key 216, the joy sticks 218, and the group of operation buttons 220 are arranged on a top surface 222 of the casing. The four types of operation buttons 224, 226, 228, and 230 are marked with different symbols in different colors in order to distinguish them from each other. More specifically, the operation button 224 is marked with a red circle, the operation button 226 is marked with a blue cross, the operation button 228 is marked with a purple square, and the operation button 230 is marked with a green triangle. A rear surface 232 of the casing of the operation device 202 is provided with a plurality of LEDs, not shown.

The user holds a left side grip portion 234b with the left hand, and a right side grip portion 234a with the right hand when operating the operation device 202. The arrow key 216, the joy sticks 218, and the group of operation buttons 220 are arranged on the top surface 222 of the casing so that they can be operated by the user who is holding the left side grip portion 234b and the right side grip portion 234a with the right and left hands.

An LED button 236 is also provided on the top surface 222 of the casing. The LED button 236 is used, for example, to display a particular menu screen on the television monitor 204 with the game machine 200. It also has the functions of indicating the battery level of the operation device 202 with the lighting status of the LED. For example, the LED is lit in red during charging, lit in green when fully charged, and blinks in red when the battery level is low.

The arrow key 216 is configured such that it can be pressed in four directions, i.e., up, down, right, and left directions, eight directions, i.e., up, down, right, and left directions and four directions therebetween, or in any direction. For example, the arrow key 216 is used to move in up, down, right and left directions a cursor on a screen of the television monitor 204, and scroll various kinds of information on the screen. Respectively different functions are allocated to the group of operation buttons 220 by an application program.

The joy joystick 218 has a stick supported in such a manner that the stick can be inclined in any direction, and has a sensor for detecting the amount of inclination. The stick is designed to return to a neutral position with the aid of an urging means such as a spring. The stick returns back to the neutral position when not operated. When the stick is inclined, the amounts of inclinations in a plurality of reference directions are converted into digital values, and the values are transmitted to the game machine 200 as an operation signal.

The operation device 202 further includes a select button 240, a start button 238, and the like. The start button 238 is used, e.g., when the user instructs the game machine 200 to start a program, and starts/pauses playing a movie or music. On the other hand, the select button 240 is used, e.g., when the user selects one of items of the menu displayed on the television monitor 204.

Figure 4:
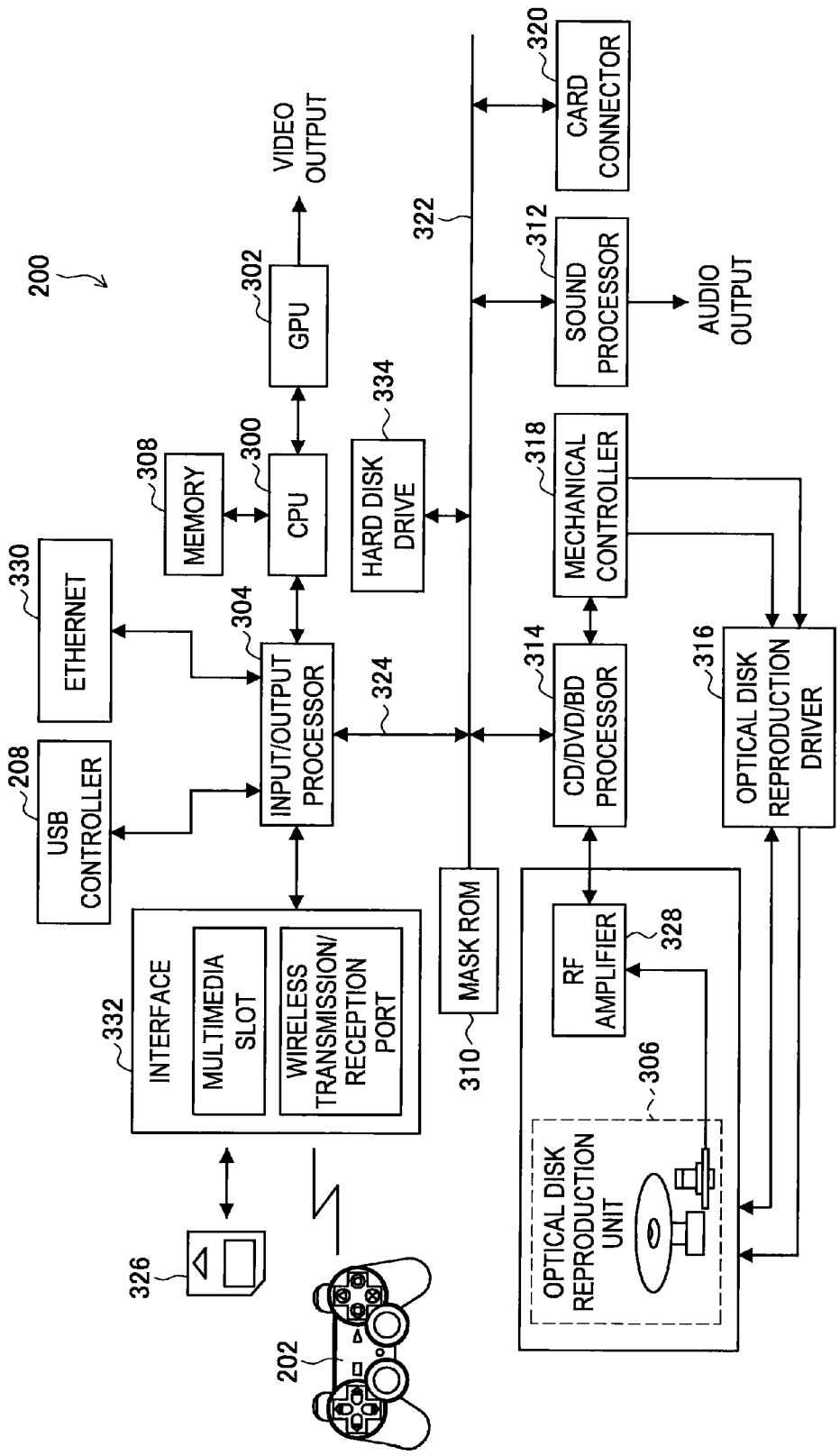
FIG. 4 is a hardware configuration diagram illustrating a game machine.

Now, the internal circuit configuration of the game machine 200 will be explained. As shown in FIG. 4, the game machine 200 includes, as its principal components, a main CPU 300, a GPU (graphic processing unit) 302, an input/output processor 304, an optical disk reproduction unit 306, a main memory 308, a mask ROM 310, and a sound processor 312. The main CPU 300 performs signal processing and control of various internal components based on various kinds of programs. The GPU 302 performs image processing. The input/output processor 304 performs interfacing or processing between the GPU 300 and some of the components in the apparatus and components outside of the apparatus. In addition, the input/output processor 304 may have functions for executing application programs, so that the game machine 200 has compatibility with other game machines.

The optical disk reproduction unit 306 reproduces an optical disk, such as a BD, DVD or CD, storing an application program or multimedia data. The main memory 308 serves as a work area for the main CPU 300 and a buffer for temporarily storing data read from an optical disk. The mask ROM 310 stores operating system programs to be executed mainly by the main CPU 300 and the input/output processing unit 304. The sound processor 312 performs audio signal processing.

The game machine 200 further includes a CD/DVD/BD processor 314, an optical disk reproduction driver 316, a mechanical controller 318, a hard disk drive 334, and a card-type connector (e.g., PC card slot) 320. The CD/DVD/BD processor 314 performs, e.g., error correction processing (e.g., CIRC (cross interleave Reed-Solomon coding)), expansion decoding processing, and so on, to a disk reproduction signal read from a CD, DVD, or BD by the optical disk reproduction unit 306 and then amplified by an RF amplifier 328, thereby reproducing data recorded on the CD, DVD, or BD. The optical disk reproduction driver 316 and the mechanical controller 318 perform rotation control of a spindle motor of the optical disk reproduction unit 306, focus/tracking control of an optical pickup, loading control of a disk tray, etc.

For example, the hard disk drive 334 stores saved data for programs and game programs read by the optical disk reproduction unit 306, or stores data such as photos, moving images, and music acquired via the input and output processor 304. The card-type connector 320 is a connection port for, e.g., a communication card, an external hard disk drive, or the like.

These internal components are connected with each other mainly through bus lines 322, 324, and the like. The main CPU 300 and the GPU 302 are connected through a dedicated bus. Additionally, the main CPU 300 and the input/output processor 304 are connected through a high-speed BUS. Likewise, the input/output processor 304, the CD/DVD/BD processor 314, the mask ROM 310, the sound processor 312, the card-type connector 320, and the hard disk drive 334 are connected through the high-speed BUS.

The main CPU 300 executes an operating system program for the main CPU 300 stored in the mask ROM 310 to control the operation of the game machine 200. Further, the main CPU 300 reads various kinds of programs and other data from an optical disk such as a BD, DVD-ROM, or CD-ROM and loads the programs into the main memory 308. Furthermore, the main CPU 300 executes the programs loaded to the main memory 308. Alternatively, the main CPU 300 downloads various kinds of programs and other data via the communication network, and executed the downloaded programs.

The input/output processor 304 executes an operating system program for the input/output processor stored in the mask ROM 310 to control data input/output with the operation device 202, a memory card 326, the USB connection terminal 208, Ethernet (registered trademark) 330, an IEEE1394 terminal, not shown, and the PC card slot. Data input/output with the operation device 202 and the memory card 326 are controlled via the interface 232 including a multimedia slot and a wireless communication port.

The GPU 302 has a function of a geometry transfer engine for executing coordinate conversion and so on, and a function of a rendering processor. The GPU 302 draws an image in a frame buffer, not shown, according to rendering instructions given by the main CPU 300. For example, in the case where programs stored on an optical disk use 3D graphics, the GPU 302 calculates, in a geometry operation process, the coordinates of polygons to constitute a three-dimensional object. Further, the GPU 302 makes, in a rendering process, an image that may be obtained by shooting the three-dimensional object by a virtual camera. The GPU 302 writes the thus obtained image into the frame buffer. The GPU 302 then outputs a video signal corresponding to the stored image to the television monitor 204. Thus, an image is displayed on a screen 204b of the television monitor 204.

The sound processor 312 has an ADPCM (Adaptive Differential Pulse Code Modulation) decoding function, an audio signal reproducing function, and a signal modulating function. The ADPCM decoding function is a function for generating waveform data from sound data encoded with ADPCM. The audio signal reproduction function is a function for generating an audio signal for, e.g., sound effects, from waveform data stored in a sound buffer incorporated in or externally connected with the sound processor 312. Internal speakers 204a, 204a of the television monitor 204 output sound represented by an audio signal. The signal modulating function is a function for modulating waveform data stored in the sound buffer.

For example, when the game machine 200 is turned on, the operating system programs for the main CPU 300 and the input/output processor 304 are read from the mask ROM 310. These operating system programs are executed by the main CPU 300 and the input/output processor 304. Thus, the main CPU 300 centrally controls each component of the game machine 200. On the other hand, the input/output processor 304 controls signal input/output between elements such as the controller 202, and the memory card 326, and the game machine 200. Also, by executing the operating system program, the main CPU 300 performs initialization such as operation check and so on. The main CPU 300 then controls the optical disk reproduction unit 306 to read an application program for a game and the like from an optical disk. After loading the application program in the main memory 308, the main CPU 300 executes the program. By executing the application program, the main CPU 300 controls the GPU 302 and the sound processor 312 following the operator's instructions received through the operation device 202 and the input/output processor 304 to control image display and production of a sound effect, a music sound, or the like.

The content recommendation system 10 applies two kinds of filters in an overlapping manner to select songs recommended to a user from among many songs. FIG. 5 is a figure schematically illustrating first metadata using a first filter. FIG. 6 is a figure schematically illustrating second metadata using a second filter. Any one of them is stored in the database 14a. As shown in FIG. 5, the first metadata includes a music ID and a plurality of attribute values of attributes. The music ID is information for identifying each of many songs recommended by the content recommendation system 10 to the user. A plurality of attributes suitable for representing features of each song are prepared in advance, and these attribute values of attributes are given to each song. Regarding attributes and attribute values, in a case where the attribute is a style of song, examples of attribute values include rock music, pop music, classical music, jazz music, and the like. In a case where the attribute is a year when an artist was born and a year when an artist made debut, examples of attribute values include 1950, 1960, 1970, and the like. In a case where the attribute is a year when a song was rated in hit chart, examples of attribute values include 1999, 2000, 2001, and the like. In a case where the attribute is a nationality of an artist, examples of attribute values include Japan, America, and the like. In a case where the attribute is a sex of an artist, examples of attribute values include male and female. Some of attribute values of attributes may be input as a result of analytic processing performed by a computer. However, most of the attributes are desirably input by a person.

As shown in FIG. 6, the second metadata includes a music ID and a plurality of feature quantities of features. Examples of features include a tempo of a song, the degree how much a sound having a particular frequency is included in a song, and the degree how many times a particular keyword appears in an explanatory text of a song. These feature quantities may be input as a result of analytic processing performed by a computer. In the explanation below, a vector whose component is the feature quantity of a feature is described as a feature vector.

In the content recommendation system 10, in view of user's preference, a condition of an attribute value (attribute value condition) is successively changed by a random number, so that a song whose first metadata satisfies the attribute value condition is extracted from many songs using the first filter. Subsequently, the degree of similarity between a preference vector representing a feature of the song preferred by the user and a feature vector of each song is calculated for each song thus extracted. A predetermined number of songs having a higher degree of similarity are determined, in the descending order of the degree of similarity, as songs which are to be recommended to the user. Like the feature vector of each song, the preference vector is a vector whose component is the feature quantity of a feature as shown in FIG. 6. These preference vectors may be generated by composing the feature vectors of songs preferred by the user. The degree of similarity between vectors may be an angle between both of the vectors. In this case, the smaller the formed angle is, the higher the degree of similarity is. According to the present embodiment, various types of songs are successively presented to the user, and contents continuously interesting to the user can be recommended.

Figure 7:
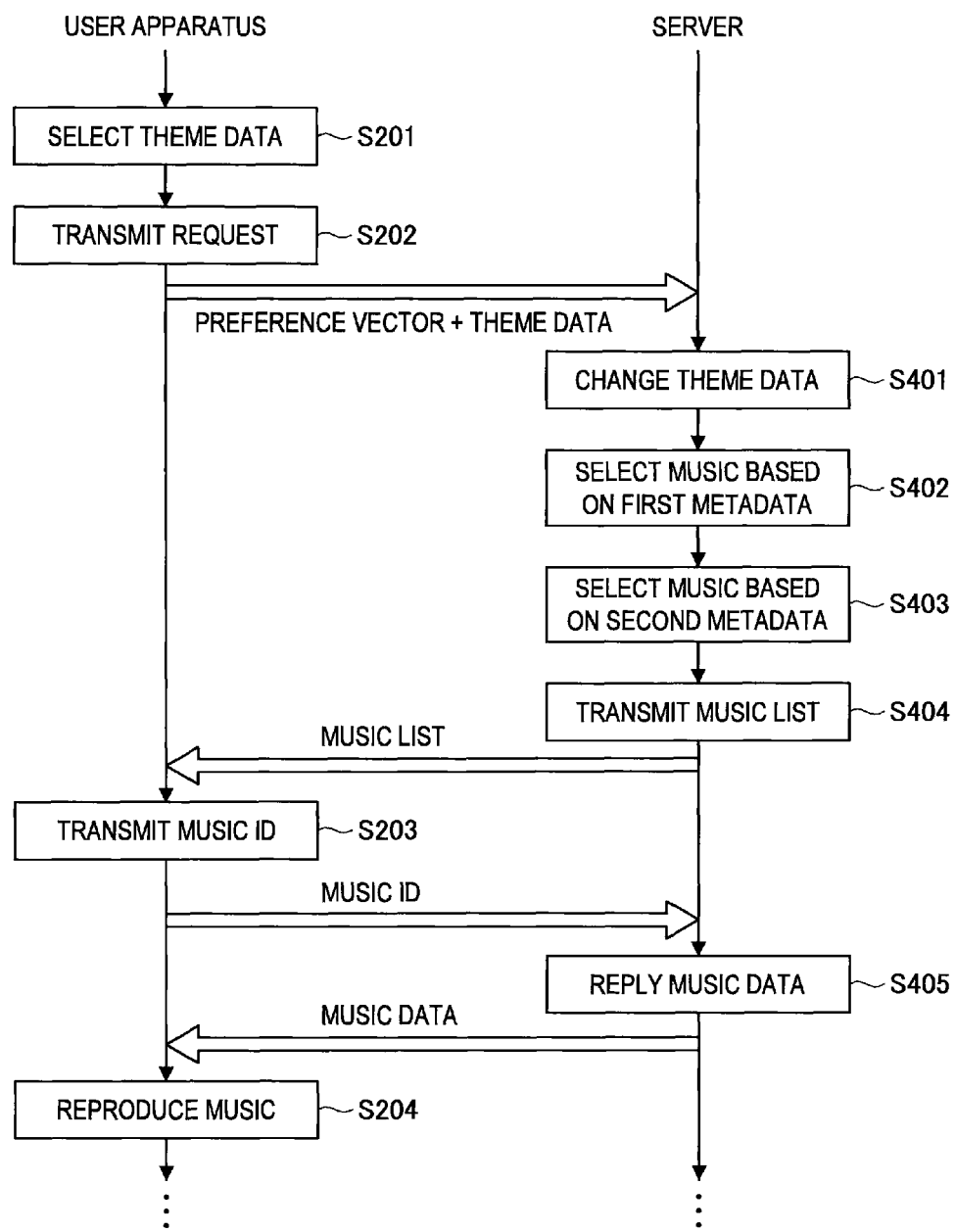
FIG. 7 is an operation flow diagram illustrating a content recommendation system according to an embodiment of the present invention.

FIG. 7 is an operation flow diagram of the content recommendation system 10. First, in the content recommendation system 10, theme data is selected by the user apparatus 12 (S201). The theme data includes a theme template ID and an attribute value serving as a parameter of a theme template identified by the theme template ID. As shown in FIG. 8, the theme template is a template for generating a condition of each attribute value (attribute value condition) of a song, and attribute values of attributes specified by the theme template is given as parameters, whereby an attribute value condition of the song is obtained. In FIG. 8, attributes of "year when an artist was born" and "style" are specified, and for example, "1980" and "rock music" are given to these attributes, whereby an attribute value condition indicating that "the year when the artist was born is 1980's, and the style is rock music" is obtained. In the above first filter, reference is made to the first metadata as shown in FIG. 5, and songs satisfying the attribute value condition thus determined are selected from among many songs.

Figure 9:
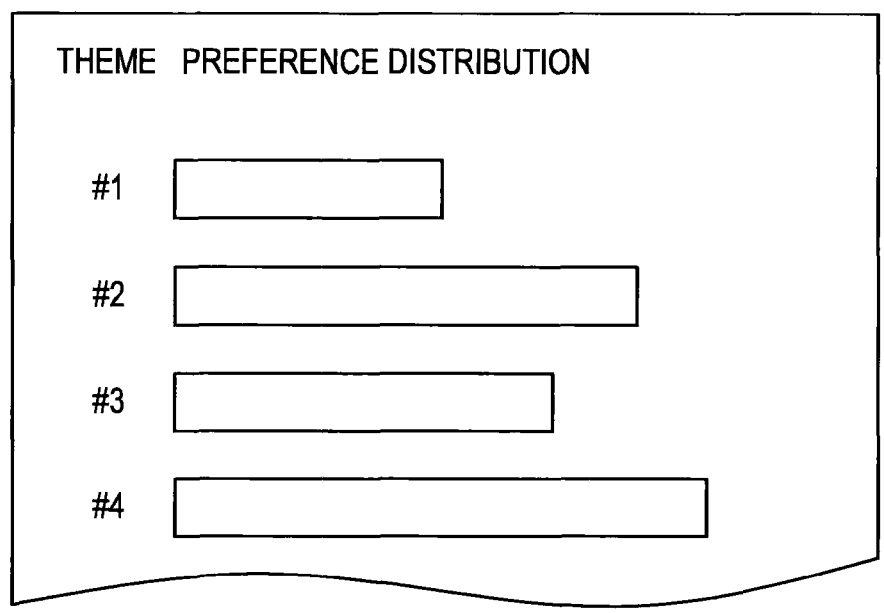
FIG. 9 is a diagram schematically illustrating theme preference distribution data.
Figure 10:
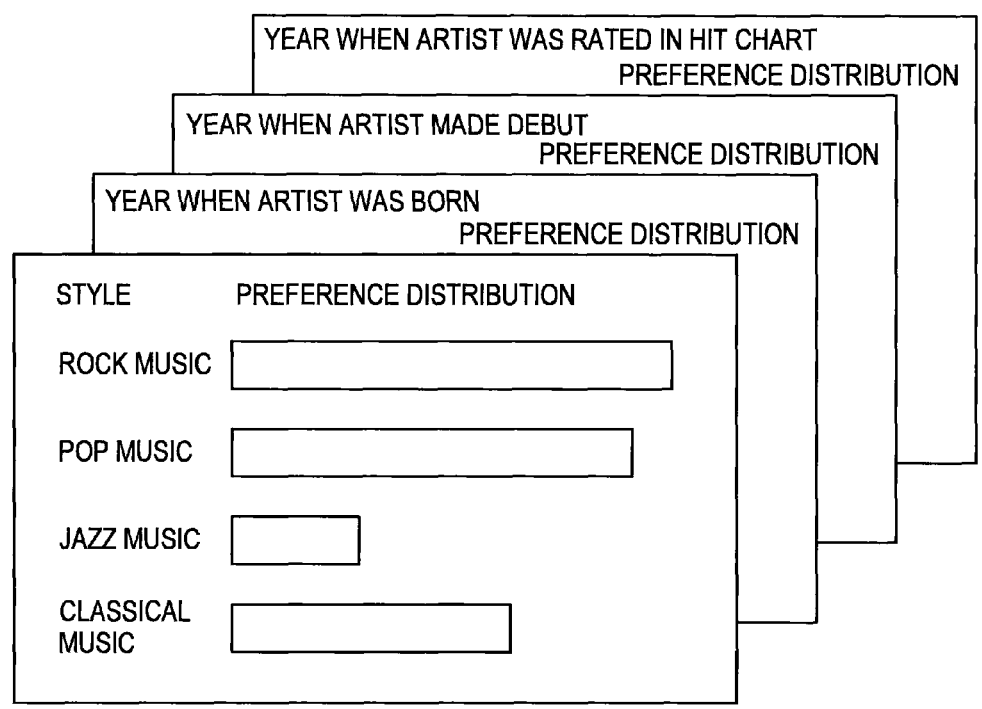
FIG. 10 is a diagram schematically illustrating attribute value preference distribution data.

A plurality of theme templates are generated by a person in advance, and the theme template ID is information for identifying each theme template. As shown in FIG. 9, for each theme template ID, the user apparatus 12 stores the degree of user's preference of the theme template identified by the theme template ID (the degree how much the user prefers it), i.e., theme preference distribution data. The user apparatus 12 generates a random number, and successively selects each theme template ID according to a probability based on the degree of preference. Then, the attribute specified by the theme template identified by the selected theme template ID is obtained, and an attribute value of the attribute in question is selected. Also at this occasion, the attribute value of each attribute is selected according to a random number based on the degree of attribute. In other words, as shown in FIG. 10, for all the attributes, the user apparatus 12 stores the degree of user's preference for each attribute value, i.e., attribute value preference distribution data. The user apparatus 12 generates a random number, and selects an attribute value of the attribute specified according to a probability based on the degree of preference. Thereafter, the user apparatus 12 transmits, to the server 14, the preference vector and the theme data of the user stored in advance (S202).

The server 14 applies a change to the theme data received from the user apparatus 12 (S401). In other words, the database 14a stores theme group data as shown in FIG. 11. The theme group data includes IDs of a plurality of common theme templates and a group ID. When the server 14 obtains a theme template ID included in theme data, the server 14 refers to the theme group data, and selects one of theme template IDs which belongs to the same group as the obtained theme template ID based on a random number. Then, the attribute specified by the theme template identified by the theme template ID thus selected is obtained, and the attribute value is determined. At this occasion, as shown in FIG. 12, the database 14a stores an attribute value conversion dictionary including many pairs of attributes and attribute values, each associated with one or more pairs of other attributes and attribute values. The server 14 refers to the attribute value conversion dictionary to convert the attribute value of each attribute included in theme data received from the user apparatus 12 into the attribute value of the attribute newly obtained. Thus, the server 14 generates another theme data related to the theme data received from the user apparatus 12. Thereafter, an attribute value condition is obtained from theme data thus generated. Then, while referring to the first metadata, songs satisfying the obtained attribute value condition are selected from among many songs managed by the database 14a (S402). When the songs are selected in this manner, songs can be selected in a more unexpected manner, compared with a case where songs are selected simply using the theme data transmitted from the user apparatus 12.

Subsequently, the server 14 calculates the degree of similarity between the preference vector received from the user apparatus 12 and the feature vector of each song selected in S402, and selects a predetermined number of songs having a higher degree of similarity in the descending order of the degree of similarity (S403). Then, a list of songs including music IDs of the predetermined number of songs is replied to the user apparatus 12 (S404). When the user apparatus 12 receives a music list, the user apparatus 12 transmits one of music IDs included in the music list to the server 14 (S203), and the server 14 reads data of songs identified by the music ID from the database 14a, and replies the data (S405). The user apparatus 12 plays data of the song thus replied (S204), and the internal speakers 204a, 204a of the television monitor 204 output songs. At this occasion, information such as the title and the name of the artist of the currently played may be displayed on the screen 204b of the television monitor 204. When the songs of all the music IDs included in the music list are played as described above, the user apparatus 12 executes the processing of S201 again.

Figure 13:
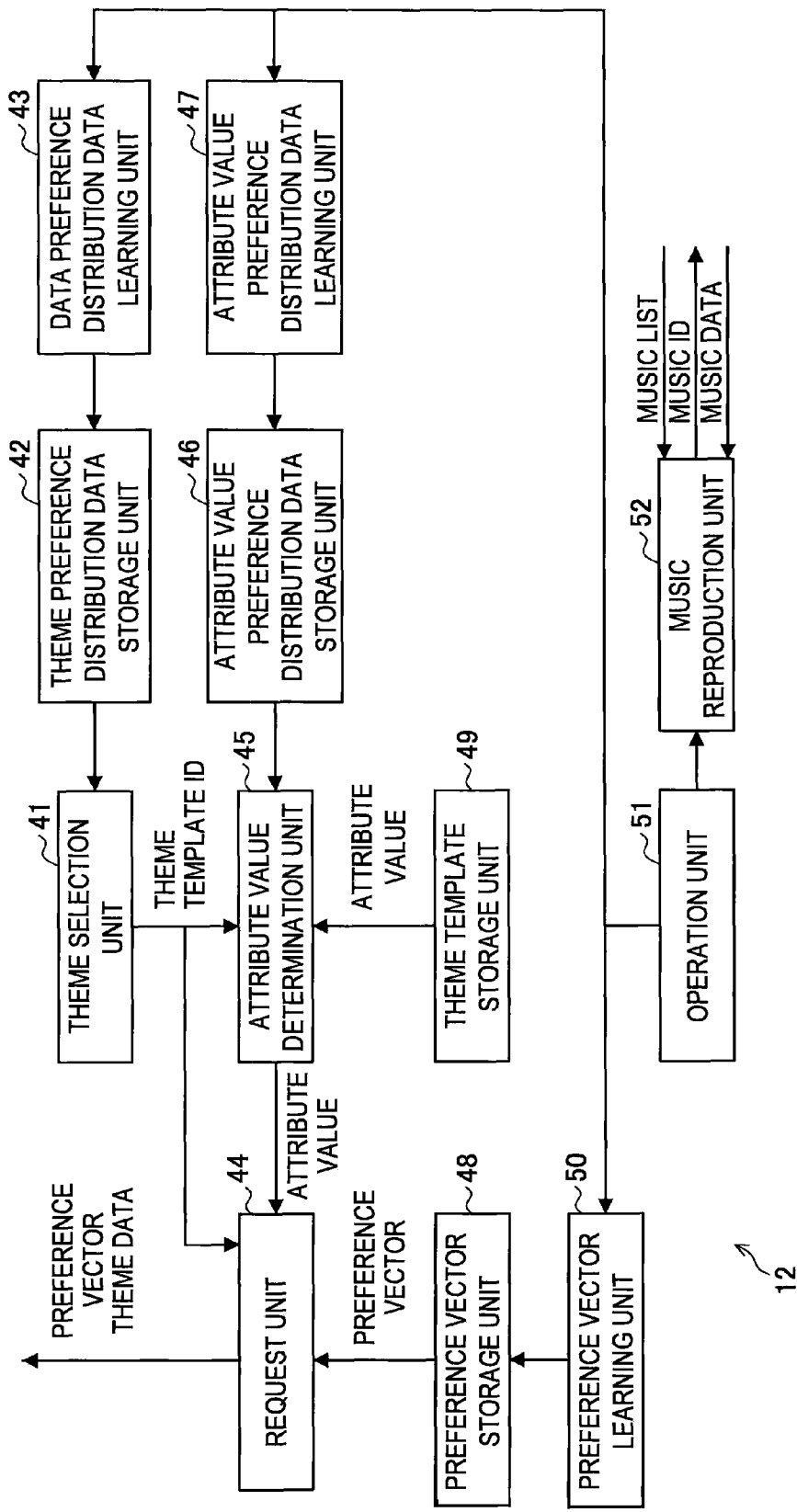
FIG. 13 is a functional block diagram illustrating a user apparatus.
Figure 14:
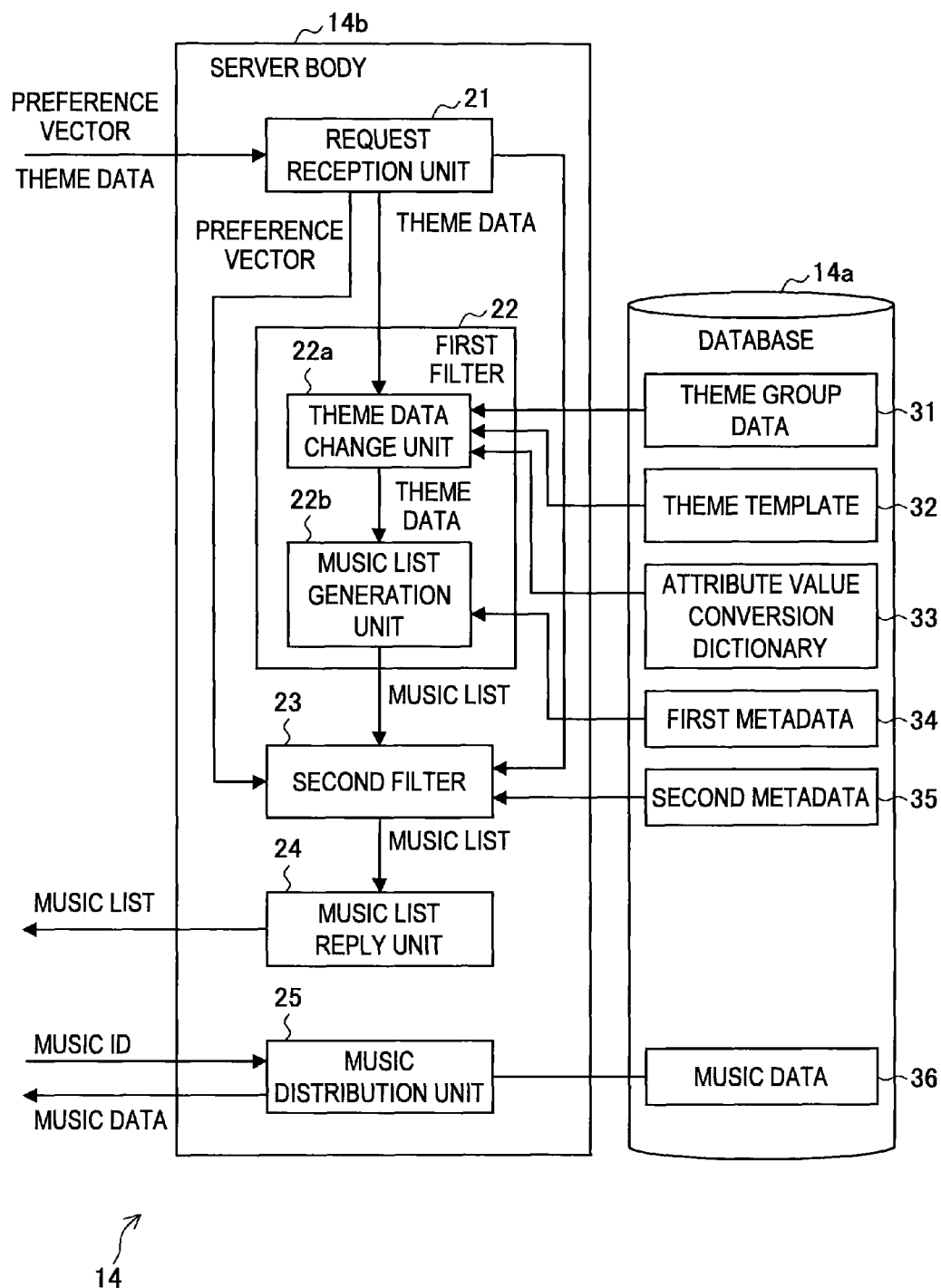
FIG. 14 is a functional block diagram illustrating a server and a database.

Now, the functional configurations of the user apparatus 12 and the server 14 will be explained. FIG. 13 is a functional block diagram of the user apparatus 12. FIG. 14 is a functional block diagram of the server 14. The functional blocks as shown in these figures are achieved by causing the user apparatus 12 and the server 14 to respectively execute programs. Each program is previously stored in a readable information storage medium in the user apparatus 12 or the server 14, and may be installed to the user apparatus 12 and the server 14 via the medium. Alternatively, it may be downloaded from another computer via the data communication network 18.

As shown in FIG. 13, the user apparatus 12 includes a theme selection unit 41, a theme preference distribution data storage unit 42, a theme preference distribution data learning unit 43, a request unit 44, an attribute value determination unit 45, an attribute value preference distribution data storage unit 46, an attribute value preference distribution data learning unit 47, a preference vector storage unit 48, a theme template storage unit 49, a preference vector learning unit 50, an operation unit 51, and a music reproduction unit 52.

First, the theme preference distribution data storage unit 42 is mainly constituted by the hard disk drive 334 or the memory 308, and stores theme preference distribution data as shown in FIG. 9. The theme preference distribution data learning unit 43 is mainly constituted by the main CPU 300 and the memory 308. The theme preference distribution data is updated according to the contents of operation performed on the operation unit 51. More specifically, for a predetermined number of songs or more included in the music list transmitted from the server 14, processing is performed to increase the degree of user's preference associated with the ID of the template used for generating the music list in the server 14, when (1) where s song is played to the end without performing a skip operation (positive situation 1) and when (2) a particular operation is performed to indicate that the song is preferred by the user (positive situation 2). In other words, when the positive situation 1 or 2 occurs with respect to the song in the music list generated by the theme template, the degree of preference of the theme template is increased. On the contrary, for a predetermined number of songs or more, processing is performed to decrease the degree of user's preference associated with the ID, when (1) playback of the song is interrupted by performing skip operation (negative situation 1) and when (2) a particular operation is performed to indicate that the song is not preferred by the user (negative situation 2). In other words, when the negative situation 1 or 2 occurs with respect to the song in the music list generated by the theme template, the degree of preference of the theme template is decreased. The theme selection unit 41 is mainly constituted by the main CPU 300 and the memory 308. The theme selection unit 41 refers to the theme preference distribution data stored in the theme preference distribution data storage unit 42 to successively select each theme template ID according to a probability based on the degree of preference. More specifically, the theme selection unit 41 has a range of random values in association with each theme template ID, and the size of the range is set according to the degree of preference. The theme selection unit 41 generates a random number, and selects a theme template ID associated with the range to which the random number belongs.

The attribute value preference distribution data storage unit 46 is mainly constituted by the hard disk drive 334 or the memory 308, and stores the attribute value preference distribution data as shown in FIG. 10. The attribute value preference distribution data learning unit 47 updates the attribute value preference distribution data according to the contents of operation performed on the operation unit 51 and the attribute values of music data stored in the user apparatus 12. More specifically, when any one of the above positive conditions occurs with respect to a predetermined number of songs or more in the music list transmitted from the server 14, a pair of attributes and attribute values which are necessary conditions in the attribute value condition used for generating the music list in the server 14 are obtained, and processing is performed to increase the degree of user's preference associated with the obtained attribute value in the attribute value preference distribution data relating to the obtained attribute. On the contrary, when any one of the above negative conditions occurs with respect to a predetermined number of songs or more, processing is performed to decrease the degree of user's preference associated with the attribute value in the attribute value preference distribution data.

When any one of the above positive conditions occurs with respect to the song currently played in the user apparatus 12, the first metadata of the song in question is obtained from the server 14. Then, processing is performed to increase the degree of user's preference associated with the attribute value of the attribute included in the obtained first metadata in respective attribute value preference distribution data. On the contrary, when any one of the above negative conditions occurs, the first metadata of the song in question is obtained from the server 14. Then, processing is performed to decrease the degree of user's preference associated with the attribute value of the attribute included in the obtained first metadata in respective attribute value preference distribution data.

Further, the attribute value preference distribution data learning unit 47 is mainly constituted by the main CPU 300 and the memory 308. The attribute value preference distribution data learning unit 47 searches all the music data stored in the hard disk drive 334 and other storage devices arranged in the user apparatus 12 of the user owned by the user, and obtains the first metadata of each song from the server 14. Then, processing is performed to increase the degree of user's preference associated with the attribute value of the attribute included in the obtained first metadata in respective attribute value preference distribution data. By doing so, respective attribute value preference distribution data can be made according to the songs owned by the user, and reflect a variety of user's preferences about songs, whereby various kinds of songs can be recommended to the user. In this case, respective attribute value preference distribution data are updated according to music data stored in the storage device arranged on the user apparatus 12. When the music data of the songs owned by the user are stored in another computer connected to the data communication network 18 of the server 14 and the like, respective attribute value preference distribution data may be updated according to the music data of the user stored in the another computer.

The theme template storage unit 49 is mainly constituted by the hard disk drive 334 or the memory 308, and stores many theme templates as shown in FIG. 8. The attribute value determination unit 45 is mainly constituted by the main CPU 300 and the memory 308. When the attribute value determination unit 45 receives the theme template ID from the theme selection unit 41, the attribute value determination unit 45 reads the theme template identified by the theme template ID from the theme template storage unit 49 to check attribute (the name of attribute) specified therein. Then, the attribute value preference distribution data of each attribute specified from the attribute value preference distribution data storage unit 46. Thereafter, the attribute value determination unit 45 refers to the attribute value preference distribution data having been read, and selects an attribute value of each attribute according to a probability based on the degree of preference. More specifically, the attribute value determination unit 45 has a range of random values in association with each attribute value, and the size of the range is set according to the degree of preference. The attribute value determination unit 45 generates a random number, and selects an attribute value associated with the range to which the random number belongs.

The preference vector storage unit 48 is mainly constituted by the hard disk drive 334 or the memory 308, and stores preference vector of the user. The request unit 44 is mainly constituted by the main CPU 300, the memory 308, the input/output processor 304, and the Ethernet 330. The preference vector and the theme data are paired, and transmitted to the server 14. The theme data includes the theme template ID output from the theme selection unit 41 and the attribute value of each attribute output from the attribute value determination unit 45.

The preference vector learning unit 50 is mainly constituted by the main CPU 300 and the memory 308, and updates the preference vector based on the contents of operation performed with the operation unit 51. More specifically, when any one of the above positive conditions occurs with respect to the song currently played in the user apparatus 12, the preference vector learning unit 50 obtains the second metadata of the song in question from the server 14. Then, the preference vector is updated so as to bring the current preference vector closer to the feature vector represented by the obtained second metadata. On the contrary, when any one of the above negative conditions occurs, the metadata of the song in question is obtained from the server 14, and the preference vector may be updated so as to bring the current preference vector away from the feature vector represented by the obtained second metadata.

The music reproduction unit 52 is mainly constituted by the main CPU 300, the memory 308, the sound processor 312, the input/output processor 304, and the Ethernet 330. The music reproduction unit 52 receives a music list from the server 14, and transmits music IDs included in the music list to the server 14 in order. Then, the music reproduction unit 52 receives music data corresponding to the music ID from the server 14, and reproduces the music data. The operation unit 51 is configured to include the operation device 202. The operation unit 51 is used to instruct the music reproduction unit 52 to skip a currently-played song, explicitly indicate that the song is a user's favorite song, or explicitly indicate that the song is a song which is not preferred by the user.

Subsequently, as shown in FIG. 14, the server 14 includes a server main body 14b and a database 14a. The server main body 14b is arranged with a request reception unit 21, a first filter 22 including a theme data change unit 22a and a music list generation unit 22b, a second filter 23, music list reply unit 24, and a music distribution unit 25. On the other hand, the database 14a is arranged with a theme group data storage unit 31, a theme template storage unit 32, an attribute value conversion dictionary storage unit 33, a first metadata storage unit 34, a second metadata storage unit 35, and a music data storage unit 36.

First, the theme group data storage unit 31 is mainly constituted by the hard disk drive 73 or the memory 71, and stores the theme group data as shown in FIG. 11. The theme template storage unit 32 stores the theme template as shown in FIG. 8. The attribute value conversion dictionary storage unit 33 is mainly constituted by the hard disk drive 73 or the memory 71, and stores the attribute value conversion dictionary as shown in FIG. 12. The first metadata storage unit 34 is mainly constituted by the hard disk drive 73 or the memory 71, and stores the first metadata as shown in FIG. 5. Further, the second metadata storage unit 35 is mainly constituted by the hard disk drive 73 or the memory 71, and stores the second metadata as shown in FIG. 6. Further, the music data storage unit 36 is mainly constituted by the hard disk drive 73, and stores data of many songs (music data) associated with identification information of the songs, i.e., music IDs.

The request reception unit 21 is mainly constituted by the processor 70, the memory 71, and the communication interface 76, and receives the preference vector and the theme data from the user apparatus 12. The theme data change unit 22a is mainly constituted by the processor 70 and the memory 71. The theme data change unit 22a refers to the theme group data stored in the theme group data storage unit 31, and selects one of theme template IDs which belong to the same group as the theme template ID included in the received theme data according to a random number. Further, the theme template of the selected theme template ID is read from the theme template storage unit 32, and checks the attribute specified by the theme template. Then, the attribute value conversion dictionary stored in the attribute value conversion dictionary storage unit 33 is looked up, and the attribute value of each attribute included in the received theme data is converted to an attribute value of each specified attribute. The theme template ID thus newly selected and the converted attribute value of each attribute are given to the music list generation unit 22b as theme data.

The music list generation unit 22b is mainly constituted by the processor 70 and the memory 71. The music list generation unit 22b refers to the first metadata stored in the first metadata storage unit 34, and selects a song attached with the received attribute value of each attribute. Then, the music list generation unit 22b outputs a list of music IDs of these songs.

The second filter 23 is mainly constituted by the processor 70 and the memory 71, and receives a list of music IDs from the music list generation unit 22b, and receives the preference vector from the request reception unit 21. Then, the feature vector stored in the second metadata storage unit 35 is read in association with each music ID included in the list, and the degree of similarity between each feature vector and the preference vector is calculated. Then, the songs are sorted by the degree of similarity, and a predetermined number of songs are selected in the descending order of the degree of similarity. Then, a list of IDs of the songs thus selected is output. The music list reply unit 24 replies the thus obtained list to the user apparatus 12.

The music distribution unit 25 is mainly constituted by the processor 70, the memory 71, and the communication interface 76. The music distribution unit 25 receives the music ID from the music reproduction unit 52 of the user apparatus 12, reads the music data stored in the music data storage unit 36 in association with the music ID, and replies the music data to the user apparatus 12.

The content recommendation system 10 as described above applies the first filter 22 and the second filter 23 in an overlapping manner to select some of many contents, and causes the user apparatus 12 to reproduce and output the selected contents in order. The first filter 22 selects songs according to attribute value conditions successively generated by the theme selection unit 41, the attribute value determination unit 45, and the theme data change unit 22a. The second filter 23 selects songs according to the degree of similarity between the feature vector of each song and the preference vector of the user. Therefore, various songs can be recommended to the user, compared with a case where songs are selected simply using a preference vector. In particular, since the attribute value condition is determined based on a random number, songs can be recommended to the user in an unexpected manner. Further, the first filter 22 extracts some of many songs, and thereafter, the processing of the second filter 23 is executed on some of the songs. Therefore, the amount of calculation necessary for recommending songs can be reduced.

Further, the theme data are generated upon stochastically selecting a theme template according to the theme preference distribution data and stochastically selecting an attribute value according to the attribute value preference distribution data. Therefore, various kinds of theme data can be generated according to the user's preference. Since songs are selected using these various kinds of theme data, various kinds of songs can be recommended to the user. Further, the theme data change unit 22a uses the theme group data and the attribute value conversion dictionary to change the theme data received from the user apparatus 12 to another theme data. Accordingly, the first filter 22 can select songs according to the theme template and the attribute value which are not yet stored in the user apparatus 12. Therefore, the degree of unexpectedness and diversity in song selection can be increased.

Further, in the content recommendation system 10, the attribute value preference distribution data are updated according to the attribute values of the songs owned by the user. Therefore, even though the user has various kinds of preferences in music, various kinds of songs can be recommended according to the various kinds of preferences.

The present invention is not limited to the above embodiment. Various modifications may be applied. For example, the content recommendation processing may not be shared by the user apparatus 12 and the server 14. One computer may select songs recommended to the user. On the contrary, the content recommendation processing may be shared by many computers. In the explanation above, the attribute value preference distribution data are updated based on the contents of operation performed with the operation unit 51. However, the attribute value preference distribution data may be updated based on only the songs owned by the user. Alternatively, instead of using the second filter 23, songs selected by the first filter 22 may be recommended to the user as they are.

Figure 15:
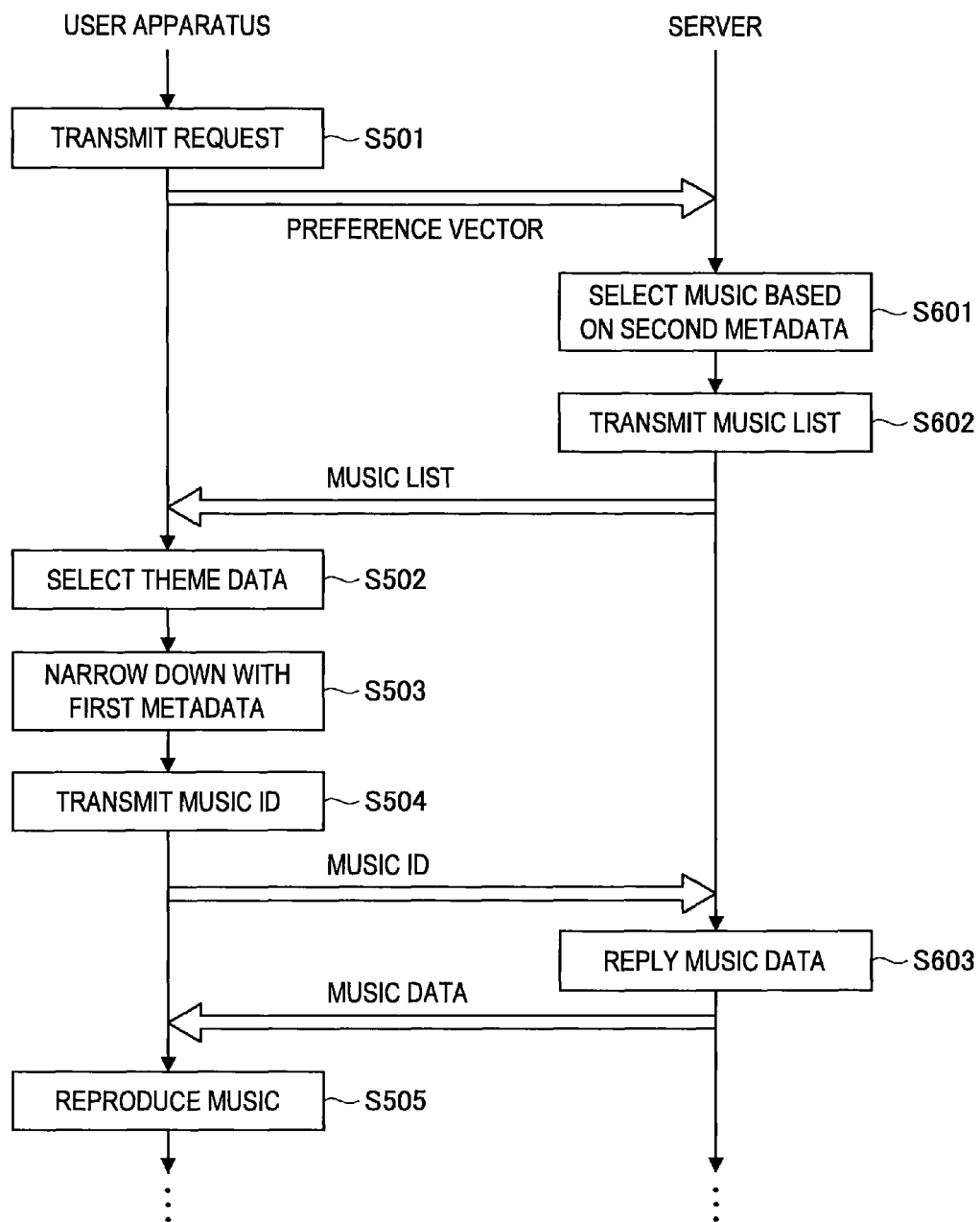
FIG. 15 is a modified operation flow diagram illustrating a content recommendation system according to an embodiment of the present invention.

Alternatively, first, the server 14 may select songs with the second filter, and thereafter, the user apparatus 12 may further select songs from among the selection result (narrowing down) with the first filter. FIG. 15 illustrates this modified operation flow diagram. In the content recommendation system 10 according to the modification, first, the user apparatus 12 transmits user's preference vector to the server 14 (S501).

The server 14 calculates the degree of similarity between the preference vector received from the user apparatus 12 and each feature vector of all or some of the songs stored in the music database 36, and selects a predetermined number of songs having a higher degree of similarity in the descending order of the degree of similarity (S601). Then, a music list including the music IDs of the predetermined number of songs is replied to the user apparatus 12 (S602). When the user apparatus 12 receives the music list, theme data are selected (S502). The method for selecting theme data is the same as FIG. 7. Then, the user apparatus 12 obtains an attribute value condition based on the theme data selected in S502. Thereafter, while referring to the first metadata, songs satisfying the obtained attribute value condition are selected from among the songs included in the music list received from the server 14, and the music IDs of the songs thus selected are included in the music list (S503). Thereafter, finally, one of the music IDs included in the music list is transmitted to the server 14 (S504). Then, the server 14 reads data of the song identified by the music ID from the database 14a, and replies the data (S603). The user apparatus 12 reproduces the data of the song thus replied (S505), and the internal speakers 204a, 204a of the television monitor 204 output music. When the songs of all the music IDs included in the music list are reproduced in this manner, the user apparatus 12 executes the processing of S201 again. When the processings are thus performed, the load of the processings of the server 14 can be reduced.

Alternatively, selection of songs based on the first metadata may be shared by the user apparatus 12 and the server 14. For example, when the attribute value condition includes a plurality of AND conditions (product set), the server 14 may select songs satisfying some of the conditions, and the user apparatus 12 may select songs satisfying the remaining conditions from among the songs included in the selection result. The user apparatus 12 may determine, based on the remaining conditions, the order of reproduction of the songs included in the selection result given by the server 14 or the songs further satisfying the remaining conditions.

Alternatively, songs reproduced by the user apparatus 12 or the server 14 may exclude songs which the user does not like. In a case where an operation is performed with the operation device 202 to explicitly indicate negative evaluation during reproduction of a song (particular operation indicating that the user does not like the song) or an operation is performed to give an instruction of pausing reproduction, the user apparatus 12 causes the music ID of the song to be included in a disliked music list stored in the hard disk drive 334. When the user apparatus 12 receives the music list from the server, and the music list includes a music ID of the song listed in the disliked music list, the song may not be allowed to be reproduced. Alternatively, when the disliked music list of each user is managed by the server 14, and a music list is generated in the server 14, the music list may not include the music ID of the song listed in the disliked music list.

Instead of generating the disliked music list, a classifier (SVM: Support Vector Machine) may be used to determine whether the user likes or dislikes each song. For example, classifier software is installed to the user apparatus 12. In a case where an operation is performed with the operation device 202 to explicitly indicate negative evaluation during reproduction of a song (particular operation indicating that the user does not like the song, or an operation is performed to give an instruction of pausing reproduction, or in a case where an operation is performed with the operation device 202 to explicitly indicate favorable evaluation during reproduction of a song (particular operation indicating that the user likes the song), or the song is played until the end of the song without interruption, this fact is input to the classifier, so that the classifier learns the user's preference. Then, for each song having the music ID included in the music list transmitted from the server 14, the classifier may determine whether the user likes a song or not, and the song disliked by the user may not be allowed to be reproduced.

Figure 16:
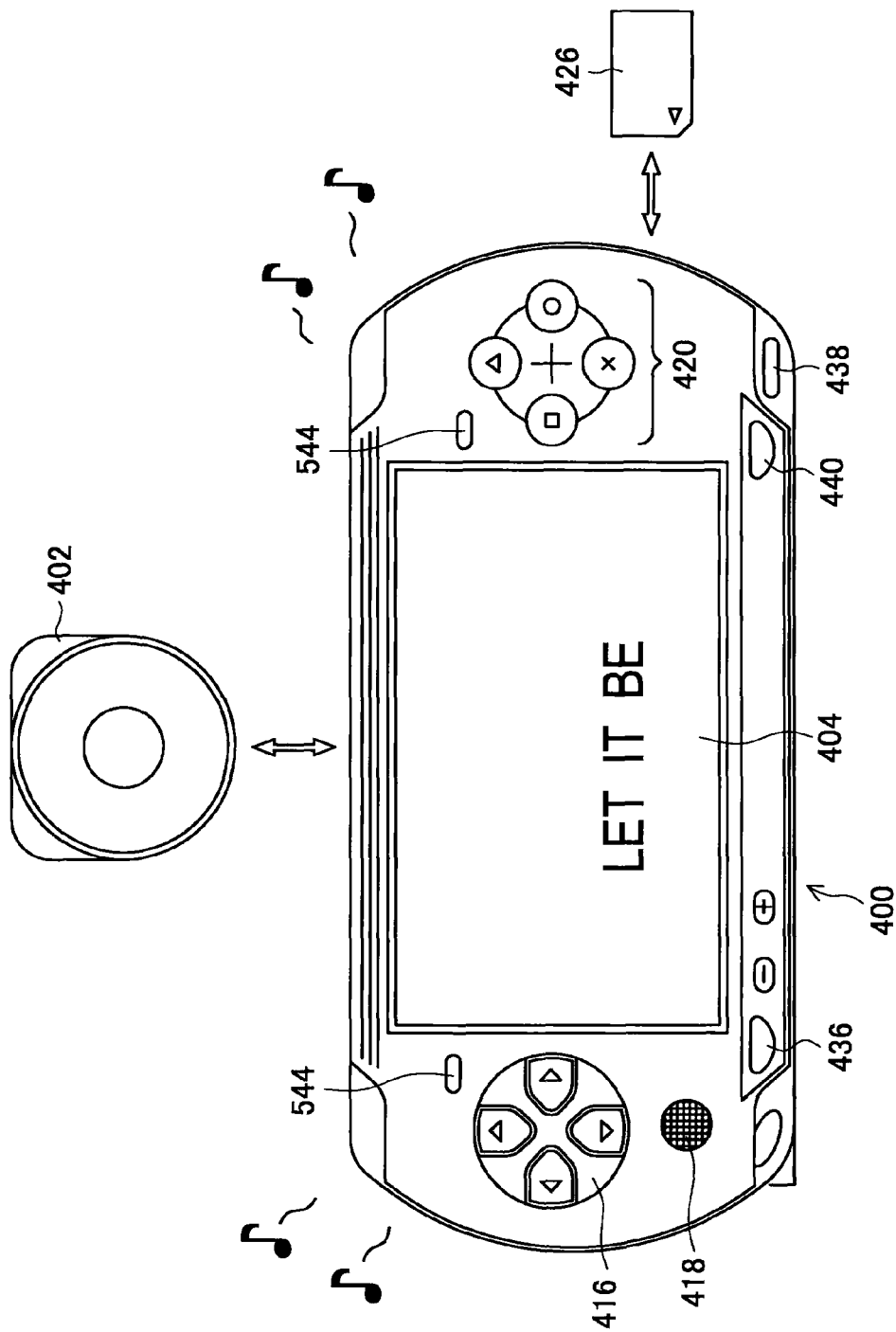
FIG. 16 is an external view illustrating a portable game machine.

The user apparatus 12 may be achieved with various kinds of hardware. For example, the user apparatus 12 may be achieved with the portable game machine. FIG. 16 illustrates an external appearance of a portable game machine. The portable game machine 400 reproduces digital contents such as moving images, still images and music, and executes a game program and the like. Each content is read from an external storage medium detachable from the portable game machine 400, or is downloaded via data communication. The external storage medium according to this embodiment is a small optical disk 402 such as a UMD (Universal Media Disc) and a memory card 426. The optical disk 402 and the memory card 426 respectively are mounted on a drive device (not shown) provided in the portable game machine 400. The optical disk 402 is not only capable of storing music data and still image data but also storing moving image data such as a movie having a relatively large data size. The memory card 426 is a small memory card which can also be detachably installed in a digital camera or a cell phone. The memory card 426 primarily stores still image data, moving image data, audio data, and the like, generated by the user by using another device or data exchanged with other devices.

The portable game machine 400 is provided with a liquid crystal display 404, operation unit members such as an arrow key 416, an analog stick 418, buttons 420, and the like. The user holds the right and left ends of the portable game machine 400 with both hands. The arrow key 416 or the analog stick 418 is operated primarily by the left thumb to specify up/down/left/right movement. The buttons 420 are used primarily by the right thumb to provide various instructions. Unlike the arrow key 416 and the buttons 420, a home button 436 is provided at a position not likely to be pressed by any finger when the left and right ends of the portable game machine 400 are held with both hands, thereby preventing erroneous operations. The liquid crystal display 404 displays a menu screen and a reproduction screen of each content. The portable game machine 400 is also provided with communication functions achieved via a USB port and a wireless LAN, for data exchange with other devices using the USB port and the wireless LAN. The portable game machine 400 is further provided with a select button 440, a start button 438, and the like. The start button 438 is used, e.g., when the user instructs the portable game machine 400 to start a game, start reproduction of contents such as a movie or music, or pause the game or the playback of the movie or music. The select button 440 is used to select a menu item displayed on the liquid crystal display 404.

Figure 17:
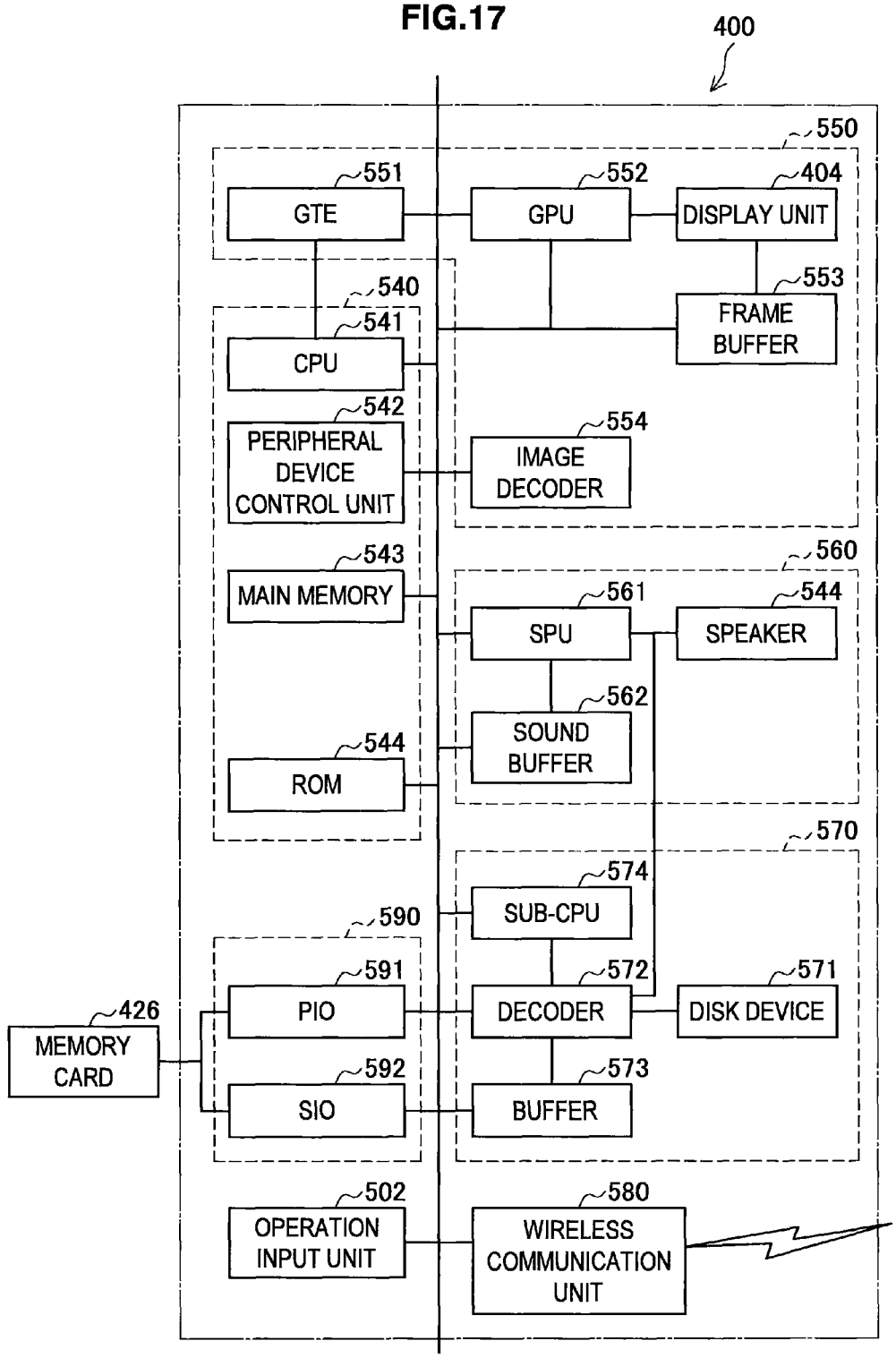
FIG. 17 is a hardware configuration diagram illustrating a portable game machine.

FIG. 17 illustrates an internal circuit configuration of the portable game machine 400. The portable game machine 400 includes a control system 540 including a CPU 541, peripheral devices, and the like, a graphics system 550 including a GPU 552 and the like for drawing an image in a frame buffer 553, a sound system 560 including a SPU (sound processing unit) 561 and the like for generating music sounds, sound effects, and the like, an optical disk control unit 570 for controlling an optical disk 402 storing an application program, a wireless communication unit 580, an interface unit 590, an operation input unit 502, a bus connected to each of the above units, and the like.

The sound system 560 includes an SPU 561 for generating, e.g., music sounds and sound effects under the control of the control system 540, a sound buffer 562 in which waveform data and the like are recorded by this SPU 561, and a speaker 544 for outputting, e.g., music sounds and sound effects which are generated by the SPU 561.

The SPU 561 has an ADPCM decoding function for reproducing sound data encoded with ADPCM, a reproduction function for generating e.g., sound effects, by reproducing waveform data stored in the sound buffer 562, and a modulation function for modulating and reproducing waveform data stored in the sound buffer 562.

The optical disk control unit 570 includes an optical disk device 571 for reproducing data such as programs recorded in an optical disk, a decoder 572 for decoding recorded data attached with, e.g., Error Correction Code (ECC), and a buffer 573 increasing the speed of reading data from the optical disk by temporarily storing data read from the optical disk device 571. The decoder 572 is connected to a sub-CPU 574.

The interface unit 590 includes a parallel I/O interface (PIO) 591 and a serial I/O interface (SIO) 592. These are interfaces connecting the memory card 426 and the portable game machine 400.

The operation input unit 502 provides an operation signal according to user's operation to the CPU 541. The wireless communication unit 580 wirelessly communicates via an infrared port or a wireless LAN. Under the control of the control system 540, the wireless communication unit 580 transmits data to another apparatus and receives data from another apparatus directly or via a wireless communication network such as the Internet.

The graphics system 550 includes a geometry transfer engine (GTE) 551, a GPU 552, a frame buffer 553, an image decoder 554, and a display unit 404.

The GTE 551 has a parallel computing mechanism for executing multiple computations in parallel. The GTE 551 performs high-speed calculation of coordinate conversion, light-source calculation, calculation of matrix and vector, and the like in response to calculation request given by the main CPU 541. Then, based on the calculation result of the GTE 551, the control system 540 defines a three-dimensional model as a combination of basic unit figures (polygons) such as a triangle and a quadrangle, and transmits a drawing instruction corresponding to each polygon for drawing a three-dimensional image to the GPU 552.

The GPU 552 draws a polygon in the frame buffer 553 according to a drawing instruction given by the control system 540. Further, the GPU 552 performs flat shading, Gouraud shading for determining the color in the polygon by interpolating the color at the apexes of the polygon, and texture mapping for pasting textures stored in a texture region of the frame buffer to the polygon.

The frame buffer 553 stores an image drawn by the GPU 552. This frame buffer 553 is constituted by a so-called dual port RAM. The frame buffer 553 can perform, at a time, drawing operation of the GPU 552, transfer from the main memory 543, and reading operation for display. This frame buffer 553 includes not only a display region for outputting as a video output but also a CLUT region storing a Color Look Up Table (CLUT) which is looked up by the GPU 552 to draw a polygon and the like and the texture region storing textures. These CLUT region and the texture region are dynamically changed according to changes of display region and the like.

Under the control of the control system 540, the display unit 3 displays an image stored in the frame buffer 553. Under the control of the CPU 541, the image decoder 554 decodes image data of still images or moving images stored in the main memory 543 and compressed and encoded by orthogonal transformation such as discrete cosine transform under the control of the CPU 541, and stores the decoded image data to the main memory 543.

The control system 540 includes the CPU 541, a peripheral device control unit 542 for performing, e.g., control of direct memory access (DMA) transfer and interruption control, the main memory 543 made of a RAM, and a ROM 544. The ROM 544 stores programs such as an operating system and the like for controlling the respective units of the portable game machine 400. The CPU 541 controls the overall portable game machine 400 by reading the operating system stored in the ROM 544 to the main memory 543 and executing the operating system having been read. The user apparatus 12 can also be achieved using the portable game machine 400 as described above.

The user apparatus 12 can also be achieved using a general-purpose personal computer. FIG. 18 illustrates an internal circuit configuration of the general-purpose personal computer.

The general-purpose personal computer includes, as its principal components, a main CPU 600, a graphics processing unit 602, an input unit 604, an output unit 605, a drive 614, a main memory 608, and a ROM 610. The main CPU 600 controls signal processing and internal constituent elements based on programs such as an operating system and an application. The GPU 602 performs image processing.

These units are connected with each other via a bus line 622. The bus line 622 is further connected to an input/output interface 632. The input/output interface 632 is connected to a storage unit 634 such as a hard disk and a nonvolatile memory, an output unit 605 including a display and a speaker, an input unit 604 including a keyboard, a mouse, a microphone, and the like, a peripheral device interface such as USB and IEEE1394, a communication unit 630 including a network interface for a wired or wireless LAN, and a drive 614 for driving a removable recording medium 626 such as a magnetic disk, an optical disk, or a semiconductor memory.

The main CPU 600 controls the overall operation of the personal computer by executing the operating system stored in the storage unit 634. Further, the main CPU 600 executes various kinds of programs read from the removable recording medium 626 and loaded to the main memory 608 or downloaded via the communication unit 630.

The GPU 602 has functions of a geometry transfer engine and a rendering processor. The GPU 602 performs drawing processing according to a drawing instruction given by the main CPU 600, and stores a display image to a frame buffer, not shown. The GPU 602 converts the display image stored in the frame buffer into a video signal, and outputs the video signal. The user apparatus 12 can also be achieved with the personal computer as described above.

The invention claimed is:

1. A content recommendation system comprising:
   attribute value storage means for storing an attribute value of each of one or a plurality of attributes for each of a plurality of contents;
   theme template generating means for generating a plurality of theme templates, wherein each of the plurality of theme templates comprises a theme template ID and one or more attributes;
   preference distribution storage means comprising:
   theme preference distribution data for storing a degree of a user's preference with respect to each of the plurality of theme templates, and
   attribute value preference distribution data for storing a degree of the user's preference with respect to each attribute value for each of the attributes;

attribute value acquisition means for obtaining an attribute value of at least one attribute for each of one or more contents owned by the user;

preference distribution update means for updating the degree of the user's preferences stored in the preference distribution storage means, based on the attribute value obtained by the attribute value acquisition means;

content selection means for selecting at least one of the plurality of contents by performing, in the order provided, at least the steps of:

selecting one theme template according to a probability based on the degree of the user's preference stored in the theme preference distribution data, selecting attribute values of the attributes indicated in the selected theme template according to a probability based on the degree of the user's preference stored in the attribute value preference distribution data, determining a condition for the attribute values of one or more attributes according to the selected attribute values, selecting one or more contents from the plurality of contents according to the determined condition for further filtering, and filtering the selected one or more contents from the plurality of contents according to the determined condition by using a plurality of feature quantities of features associated with each of the plurality of contents; and content presenting means for presenting the at least one of the plurality of contents selected by the content selection means to the user.

2. The content recommendation system according to claim 1, wherein the attribute value acquisition means obtains the attribute value of at least one attribute for each of the contents stored in a predetermined computer in association with the user.

3. A content recommendation method comprising:

an attribute value obtaining step for obtaining an attribute value of at least one attribute for each of one or more contents owned by a user;

a theme template generating step for generating a plurality of theme templates, wherein each of the plurality of theme templates comprises a theme template ID and one or more attributes;

a preference distribution update step for updating the degree of the user's preferences stored in preference distribution storage means based on the attribute value obtained in the attribute value obtaining step, wherein the preference distribution storage means comprises:

theme preference distribute data for storing a degree of the user's preference to each of the plurality of theme templates, and attribute value preference distribution data for storing a degree of the user's preference with respect to each attribute value for each of the attributes;

a content selecting step performing, in the order provided, steps comprising:

selecting one theme template according to a probability based on the degree of the user's preference stored in the theme preference distribution data, selecting attribute values of the attributes indicated in the selected theme template according to a probability based on the degree of the user's preference stored in the attribute value preference distribution data, determining a condition for the attribute values of one or more attributes according to the selected attribute values, selecting one or more contents from the plurality of contents according to the determined condition for further filtering, and filtering the selected one or more contents from the plurality of contents according to the determined condition by using a plurality of feature quantities of features associated with each of the plurality of contents; and a content presenting step for presenting the contents selected in the content selection step to the user.

4. A content recommendation apparatus comprising:

theme template generating means for generating a plurality of theme templates, wherein each of the plurality of theme templates comprises a theme template ID and one or more attributes;

preference distribution storage means comprising:

theme preference distribution data for storing a degree of a user's preference with respect to each of the plurality of theme templates; and attribute value preference distribute data for storing a degree of the user's preference with respect to each attribute value of one or more attributes of a content;

attribute value acquisition means for obtaining attribute values of attributes for each of one or more contents owned by the user;

preference distribution update means for updating the degree of the user's preferences stored in the preference distribution storage means, based on the attribute values obtained by the attribute value acquisition means;

content selection means for selecting at least one of the plurality of contents by performing, in the order provided, at least the steps of:

selecting one theme template according to a probability based on the degree of the user's preference stored in the theme preference distribution data, selecting attribute values of the attributes indicated in the selected theme template according to a probability based on the degree of user's preference stored in the attribute value preference distribution storage means, determining a condition for the attribute values of one or more attributes according to the selected attribute values, selecting one or more contents from the plurality of contents according to the determined condition for further filtering, and filtering the selected one or more contents from the plurality of contents according to the determined condition by using a plurality of feature quantities of features associated with each of the plurality of content; and list acquisition means for obtaining a list of contents selected by the content selection means.

5. A content recommendation method comprising:

an attribute value obtaining step for obtaining an attribute value of a predetermined attribute for each of one or more contents owned by a user;

a theme template generating step for generating a plurality of theme templates, wherein each of the plurality of theme templates comprises a theme template ID and one or more attributes;

a preference distribution update step for updating the degree of the user's preferences stored in preference distribution storage means based on the attribute value obtained by the attribute value obtaining step, wherein the preference distribution storage means comprises:

theme preference distribute data for storing a degree of the user's preference with respect to each of the plurality of theme templates, and attribute value preference distribution data for storing a degree of the user's preference with respect to each attribute value for each of the attributes;

a content selecting step for selecting at least one of the plurality of contents by performing, in the order provided, steps comprising:

selecting one theme template according to a probability based on the degree of the user's preference stored in the theme preference distribution data, selecting attribute values of the attributes indicated in the selected theme template according to a probability based on the degree of the user's preference stored in the attribute value preference distribution storage means, determining a condition for the attribute values of one or more attributes according to the selected attribute values, selecting one or more contents from the plurality of contents according to the determined condition for further filtering, and filtering the selected one or more contents from the plurality of contents according to the determined condition by using a plurality of feature quantities of features associated with each content; and a list acquisition step for obtaining a list of contents selected in the content selecting step.

6. A program stored on a computer-readable, non-transitory storage medium, which when executed by a processor of a computer, causes the computer to perform functions comprising:

theme template generating means for generating a plurality of theme templates, wherein each of the plurality of theme templates comprises a theme template ID and one or more attributes;

preference distribution storage means comprising:

theme preference distribution data for storing a degree of a user's preference with respect to each of a plurality of theme templates; and attribute value preference distribute data for storing a degree of the user's preference with respect to each attribute value of one or more attributes of a content;

attribute value acquisition means for obtaining attribute values of attributes for each of one or more contents owned by the user;

preference distribution update means for updating the degree of the user's preferences stored in the preference distribution storage means, based on the attribute values obtained by the attribute value acquisition means;

content selection means for selecting at least one of the plurality of contents by performing, in the order provided, at least the steps of:

selecting one theme template according to a probability based on the degree of the user's preference stored in the theme preference distribution data, selecting attribute values of the attributes indicated in the selected theme template according to a probability based on the degree of user's preference stored in the attribute value preference distribution storage means, determining a condition for the attribute values of one or more attributes according to the selected attribute values, selecting one or more contents from the plurality of contents according to the determined condition for further filtering, and filtering the selected one or more contents from the plurality of contents according to the determined condition by using a plurality of feature quantities of features associated with each of the plurality of contents; and list acquisition means for obtaining a list of contents selected by the content selection means.

7. A computer-readable, non-transitory information storage medium storing a program comprising instructions, which when executed by a processor of a computer, cause the computer to perform functions comprising:

theme template generating means for generating a plurality of theme templates, wherein each of the plurality of theme templates comprises a theme template ID and one or more attributes;

preference distribution storage means comprising:

theme preference distribution data for storing a degree of a user's preference with respect to each of a plurality of theme templates; and attribute value preference distribute data for storing a degree of the user's preference with respect to each attribute value of one or more attributes of a content;

attribute value acquisition means for obtaining attribute values of attributes for each of one or more contents owned by the user;

preference distribution update means for updating the degree of the user's preferences stored in the preference distribution storage means, based on the attribute values obtained by the attribute value acquisition means;

content selection means for selecting at least one of the plurality of contents by performing, in the order provided, at least the step of:

selecting one theme template according to a probability based on the degree of the user's preference stored in the theme preference distribution data, selecting attribute values of the attributes indicated in the selected theme template according to a probability based on the degree of user's preference stored in the attribute value preference distribution storage means, determining a condition for the attribute values of one or more attributes according to the selected attribute values, selecting one or more contents from the plurality of contents according to the determined condition for further filtering, and filtering the selected one or more contents from the plurality of contents according to the determined condition by using a plurality of feature quantities of features associated with each content; and list acquisition means for obtaining a list of contents selected by the content selection means.

8. The content recommendation system according to claim 1, wherein at least one of the plurality of the content is a song.

9. The content recommendation system according to claim 8, wherein the features comprise a tempo of the song, the degree of how much a sound having a particular frequency is included in the song, and the degree of how many times a particular keyword appears in an explanatory text of the song.

10. The content recommendation system according to claim 1, wherein the attribute value selection means uses random numbers to select the theme template and the attribute values.

11. The content recommendation method according to claim 3, wherein the condition determination step uses random numbers to select the theme template and the attribute values.

12. The content recommendation apparatus according to claim 4, wherein at least one of the plurality of the content is a song.

13. The content recommendation apparatus according to claim 12, wherein the features comprise a tempo of the song, the degree of how much a sound having a particular frequency is included in the song, and the degree of how many times a particular keyword appears in an explanatory text of the song.

14. The content recommendation apparatus according to claim 4, wherein the attribute value selection means uses random numbers to select the theme template and the attribute values.

15. The program according to claim 6, wherein at least one of the plurality of the content is a song.

16. The program according to claim 15, wherein the features comprise a tempo of the song, the degree of how much a sound having a particular frequency is included in the song, and the degree of how many times a particular keyword appears in an explanatory text of the song.

17. The program according to claim 6, wherein the attribute value selection means uses random numbers to select the theme template and the attribute values.

18. The information storage medium according to claim 7, wherein at least one of the plurality of the content is a song.

19. The information storage medium according to claim 18, wherein the features comprise a tempo of the song, the degree of how much a sound having a particular frequency is included in the song, and the degree of how many times a particular keyword appears in an explanatory text of the song.

20. The information storage medium according to claim 7, wherein the attribute value selection means uses random numbers to select the theme template and the attribute values.

\* \* \* \* \*